(12) United States Patent
Wilson et al.

(10) Patent No.: US 8,434,502 B2
(45) Date of Patent: May 7, 2013

(54) CAUSTIC RECOVERY SYSTEM FOR C.I.P. CLEANING SYSTEM

(76) Inventors: Barry L. Wilson, Zellwood, FL (US); Dale Brintnall, Lake Wales, FL (US)

(\*) Notice: Subject to any disclaimer, the term of this patent is extended or adjusted under 35 U.S.C. 154(b) by 972 days.

(21) Appl. No.: 12/485,498

(22) Filed: Jun. 16, 2009

(65) Prior Publication Data
US 2010/0313921 A1  Dec. 16, 2010

(51) Int. Cl.
*B08B 3/00* (2006.01)

(52) U.S. Cl.
USPC ............................. 134/109; 134/57 R; 99/275

(58) Field of Classification Search ..................... None
See application file for complete search history.

(56) References Cited

U.S. PATENT DOCUMENTS

| | | |
|---|---|---|
| 4,061,504 A | 12/1977 | Zall et al. |
| 4,124,504 A | 11/1978 | Munden |
| 4,409,999 A | 10/1983 | Pedziwiatr |
| 4,656,843 A | 4/1987 | Sando et al. |
| 4,770,196 A | 9/1988 | Osswald |
| 4,941,945 A | 7/1990 | Pettersson |
| 5,514,282 A | 5/1996 | Hibbard et al. |
| 5,562,829 A | 10/1996 | Malcolm et al. |
| 5,595,201 A | 1/1997 | Dobrez et al. |
| 5,783,245 A | 7/1998 | Simpson, II |
| 5,888,311 A | 3/1999 | Laufenberg et al. |
| 5,951,874 A | 9/1999 | Jangbarwala et al. |
| 6,000,412 A | 12/1999 | Chan et al. |
| 6,502,270 B2 | 1/2003 | Rinne |
| 6,767,408 B2 | 7/2004 | Kenowski et al. |
| 6,858,090 B2 | 2/2005 | Hebert |
| 6,889,603 B2 | 5/2005 | Carhuff et al. |
| 7,247,210 B2 | 7/2007 | Staub et al. |
| 2001/0035198 A1 | 11/2001 | Carawan et al. |
| 2004/0118291 A1* | 6/2004 | Carhuff et al. ............ 99/275 |
| 2004/0187897 A1* | 9/2004 | Kenowski et al. .......... 134/56 R |

\* cited by examiner

*Primary Examiner* — Michael Barr
*Assistant Examiner* — Jason Ko
(74) *Attorney, Agent, or Firm* — Bernhard P. Molldrem, Jr.

(57) ABSTRACT

A caustic recovery arrangement for a clean-in-place system permits recovery of the caustic solution used for cleaning sanitary liquid-food processing equipment. A recovery tank receives the caustic aqueous solution and entrained solids. The caustic recovery tank has an upper barrel portion and a lower conic portion. The caustic solution remains in the recovery tank for about eight hours to allow the solids to settle out into the conic portion. A solution drain conduit at a lower end of the barrel portion connects to a caustic recovery line with a pump that feeds the recovered solution back to a main caustic supply tank. A solids drain conduit leads from an outlet at the bottom end of the conic portion of the caustic recovery tank to a solids receptacle so that the solids can be recovered for use, e.g., as animal feed or as fertilizer.

10 Claims, 3 Drawing Sheets

CAUSTIC RECOVERY SYSTEM FOR C.I.P. CLEANING SYSTEM

BACKGROUND OF THE INVENTION

This invention relates to systems for processing comestible products, examples of which are dairy products such as milk, cream, and ice cream mix and other liquid food products, e.g., citrus juices, fruit juices and soups, and can also include pharmaceuticals. The invention is more particularly concerned with systems for cleaning continuous-process processing equipment, e.g., fruit juice processors, milk pasteurizers, or the like, by flowing a caustic cleaning solution through the equipment to remove food particles that may have become deposited on the walls of the tanks, tubing, or other components. The invention is concerned with a technique for recovering the caustic solution by separating out the solids components that become entrained in the caustic solution, and then returning the clear caustic solution for re-use.

In the food processing industry, the preparation of milk, orange juice or similar liquid food products is typically carried out in a continuous process system, in which the product flows in from a supply or balance tank, and is subjected to heating, evaporation, and other processing in a closed loop or an open loop that is formed of tubes, tanks, and other equipment such as pumps, homogenizers, and the like. At the end of a product run, which may be continuous for twelve hours or more, the equipment is cleaned and sanitized for a successive product run. Cleaning is typically carried out by flowing a cleaning solution through the system, for a period of time long enough to remove product that has deposited and caked on the surfaces of the processing equipment. This is followed by a rinse of clean water, and then finally hot water or steam can be passed through the equipment to sterilize it.

In conventional practice, the cleaning solution is made up as an aqueous solution of a caustic material, such as potassium hydroxide (KOH). At the end of the caustic phase of the cleaning process, the caustic solution and any entrained solids are discharged to a drain, and the solution is considered waste and is not reused. Moreover, any of the solid particles removed by the caustic and entrained in the solution are also discharged, and have to be processed as waste. Unfortunately, the caustic material can be quite expensive in the volumes needed for a typical dairy processing plant or citrus juice processing plant, and so any success in recovering the caustic solution would result in a cost savings. Also, there is some nutritive value in the food particles that are carried in the caustic solution, but no attempt has been made to recover those for any purpose. In addition, the discharge of the caustic material into a municipal sewage treatment facility can raise the pH of the system considerably, and can affect the ability of the sewage treatment facility to process other water-borne waste.

OBJECTS AND SUMMARY OF THE INVENTION

It is an object of the present invention to provide a C.I.P. caustic cleaning process for cleaning and sanitizing of continuous-process equipment employed in the process liquid food products and which avoids the drawbacks of the prior art.

It is more specific object to provide a C.I.P. process which collects and holds the caustic cleaning solution and entrained food particles that are cleaned from the equipment, and which allows for the food particles to settle out so that the caustic solution may be recovered for reuse.

It is another object to recover the food particles so that they can be employed as a useful byproduct of the cleaning process, for example, as a component of a fertilizer or an animal feed.

It is a further object to provide caustic recovery equipment that can be attached to existing equipment to convert it for caustic recovery.

The caustic recovery arrangement of this invention may be used for example as a component in the system for cleaning the equipment for processing whole milk, skim milk, cream, or other dairy products such as flavored milk or ice cream mix. The caustic recovery arrangement of this invention may also be used with citrus processing equipment, such as equipment for processing orange juice, grapefruit juice, lemon juice, or with equipment for processing apple juice, or other fruit juices.

According to one aspect of the invention, a clean-in-place cleaning system is associated with a liquid-food processing system. A caustic aqueous solution is caused to flow through the liquid food processing system, to pick up the food solids that tend to coat the inside surfaces of the pipes, tanks and other elements of the food processing system. A caustic supply tank holds a quantity of caustic aqueous solution, and a rinse water tank holds a supply of rinse water. A pump has its inlet side connected to inlet conduits leading from the caustic supply tank and the rinse water tank. An outlet side of this pump is connected to a conduit that leads to the internal passages of the food processing system. The system is provided with controlled valving means for controlling the connection of the caustic supply tank and the rinse water tank, respectively, to the pump.

A return conduit connects to an outlet of the food processing equipment and receives from it the caustic aqueous solution and entrained food solids that have been cleaned from the inside of the food processing system.

A conductivity sensor detects electrical conductivity of the solution in the return conduit, and controls a diverter valve in line in the return conduit after said conductivity sensor. The diverter valve has a first outlet and a second outlet, and operative to switch to the first outlet when the sensed conductivity of the contents of the return conduit is greater than a predetermined threshold, and to switch to the second outlet when the sensed conductivity is below that threshold.

A caustic recovery tank of sufficient capacity to hold the above-mentioned quantity of the caustic aqueous solution that had been held in the caustic supply tank. The caustic recovery tank has a barrel portion and a conic portion below the barrel portion. A caustic recovery conduit leads from the first outlet of the above-mentioned diverter valve to an inlet of the caustic recovery tank. A solution drain conduit leads from a lower end of the barrel portion, just above the conic portion of the caustic recovery tank. A solids drain conduit leads from an outlet at the bottom end of the conic portion of the caustic recovery tank. There is a caustic recovery pump in line in the caustic recovery conduit, and valving situated in the caustic recovery conduit and in the solids drain conduit. A portion of the caustic recovery conduit leads from a discharge of the caustic recovery pump to an inlet of the caustic supply tank. A control panel contains controls that are connected with the valving and with the caustic recovery pump, and are operative to open the caustic recovery conduit to empty the solution from the barrel portion of the caustic recovery tank and transfer said solution to the caustic supply tank after the solution and entrained solids have remained for a predetermined settle time sufficient for solid particles to settle into the conic portion of the caustic recovery tank. Then the controls are operative turn on the caustic recovery pump to pump the recovered caustic solution into the caustic supply tank; and thereafter to open the solids drain conduit to drain the solids residue out of the conic bottom portion of the recovery tank. These solids then pass through the solids drain conduit, and can go to a receptacle for further treatment so that they can be used, e.g., as animal feed or as fertilizer.

Favorably, the caustic recovery tank has a capacity of about 3,000 gallons nominal, or per scope of project. The conic bottom portion of the caustic recovery tank has its apex or pointed end at the bottom and defines an included angle of substantially ninety degrees.

There can be a second caustic recovery tank, also having a barrel portion and a conic portion below the barrel portion, an inlet, a solution drain outlet at a lower end of the barrel portion and above the conic portion; a solids drain outlet at the bottom end of the conic portion, and means to divert flow of the caustic solution and entrained solids from the caustic recovery conduit to the second caustic recovery tank. The second caustic recovery tank can be configured as an overflow tank taking the excess caustic solution flowing to the first recovery tank. Alternatively, the first and second caustic recovery tanks can be configured to be filled alternately, so that the system provides an adequate residence and settling time (e.g., eight hours) for use when the C.I.P. cleaning cycle occurs more frequently, i.e., at a shorter interval than eight hours.

The system may also include a second caustic supply tank having a capacity sufficient for holding the same quantity of caustic solution as the first caustic supply tank, and this tank may have a caustic supply conduit, an inlet, and a caustic recovery conduit, as with the first caustic supply tank.

A conductivity sensor may be positioned on the caustic supply tank, with a probe immersed in the recirculating pipeline to measure conductivity of the caustic solution. A caustic make-up source then supplies additional caustic reagent into the caustic supply tank, and controlled and determined in response to the measured conductivity of the contents of said caustic supply tank.

A solids recovery receptacle on the solids drain conduit leads serves as a repository for the recovered solids, where they can be retained for further processing into a useful product.

Favorably, the system may also have a main diverter valve with its an inlet and a first outlet connected in line in the return conduit ahead of the conductivity sensor. This diverter valve has a second outlet, with a conduit leading from said second outlet thereof to an inlet of said caustic supply tank. This valve may be controlled to cycle the caustic fluid back to the supply tank during a cleaning cycle, and then to switch over to feed the caustic fluid to the recovery tank at the end of the cleaning cycle, i.e., before the rinse cycle.

After a suitable residence time in the recovery tank, the solids entrained in the solution settle down to the lower end of the tank. This time is typically about eight hours for dairy applications and citrus processing applications. This leaves a clear caustic solution in the upper part, i.e., the barrel portion, of the caustic recovery tank. The clear caustic solution can be bled off via the caustic solution drain and caustic recovery pump to the caustic supply tank, so the caustic solution can be used for a subsequent C.I.P. cleaning process.

This avoids the need to dump the caustic solution at the end of each cleaning cycle. Discharging of the solution into a municipal sanitary sewer of other processing system can have an adverse environmental impact, which can now be avoided. Also, the caustic reagent itself can be rather costly, and the ability to recover the caustic for subsequent use can work a significant cost savings in connection with the processing of the milk, citrus juice, or other product.

The above and many other objects, features, and advantages of the arrangements and techniques of the present invention will become apparent from the ensuing detailed description of preferred embodiments of the invention, when considered in connection with the accompanying Drawing.

DETAILED DESCRIPTION OF THE PREFERRED EMBODIMENT

The invention can be embodied in a continuous process system for processing a liquid food product, and which is in the form of a closed system that may comprise one or more sanitary tanks as well as heat exchangers which may be in the form of tubular or plate type devices, as well as connecting tubing, valves and other equipment. These system elements are intended for processing and/or holding dairy products, fruit juices, or other comestible fluids which need to be maintained under sanitary conditions. Not shown here are temperature control arrangements such as refrigeration coils or heat exchangers. The system may be insulated or uninsulated. The tanks and other equipment are provided with clean-in-place nozzles and inlets that spray and/or flood a cleaning solution against the interior surfaces of the equipment that are to be in contact with the liquid food product. C-I-P technology is generally discussed in a wide assortment of literature. A supply of a caustic cleaning fluid, favorably potassium hydroxide (KOH) in aqueous solution, is held in a supply tank and is circulated through the equipment during a cleaning cycle. This attacks the deposits on the interior walls of the equipment, so that the deposit is removed from the walls, and is entrained in the circulating caustic solution. Later, a rinse of water is circulated to flush out the caustic; after that hot water, steam, or a chemical sanitizer may be used to sterilize the interior surfaces of the food processing equipment, so that it is ready for a subsequent use.

In order to conserve the caustic cleaning solution, a caustic recovery system is included in the C.I.P. system. This allows the recovery and reuse of the solution, which can be quite costly to replenish. The caustic recovery system can also be used to recover the solids that had been cleaned from the interior walls of the equipment, and the recovered solids may be put to a beneficial end use, e.g., as a cattle feed or as a fertilizer component. Also, the caustic recovery system helps avoid the environmental costs that would accompany the routine dumping of the caustic solution and entrained solids into the municipal sewer system.

Figure 1:
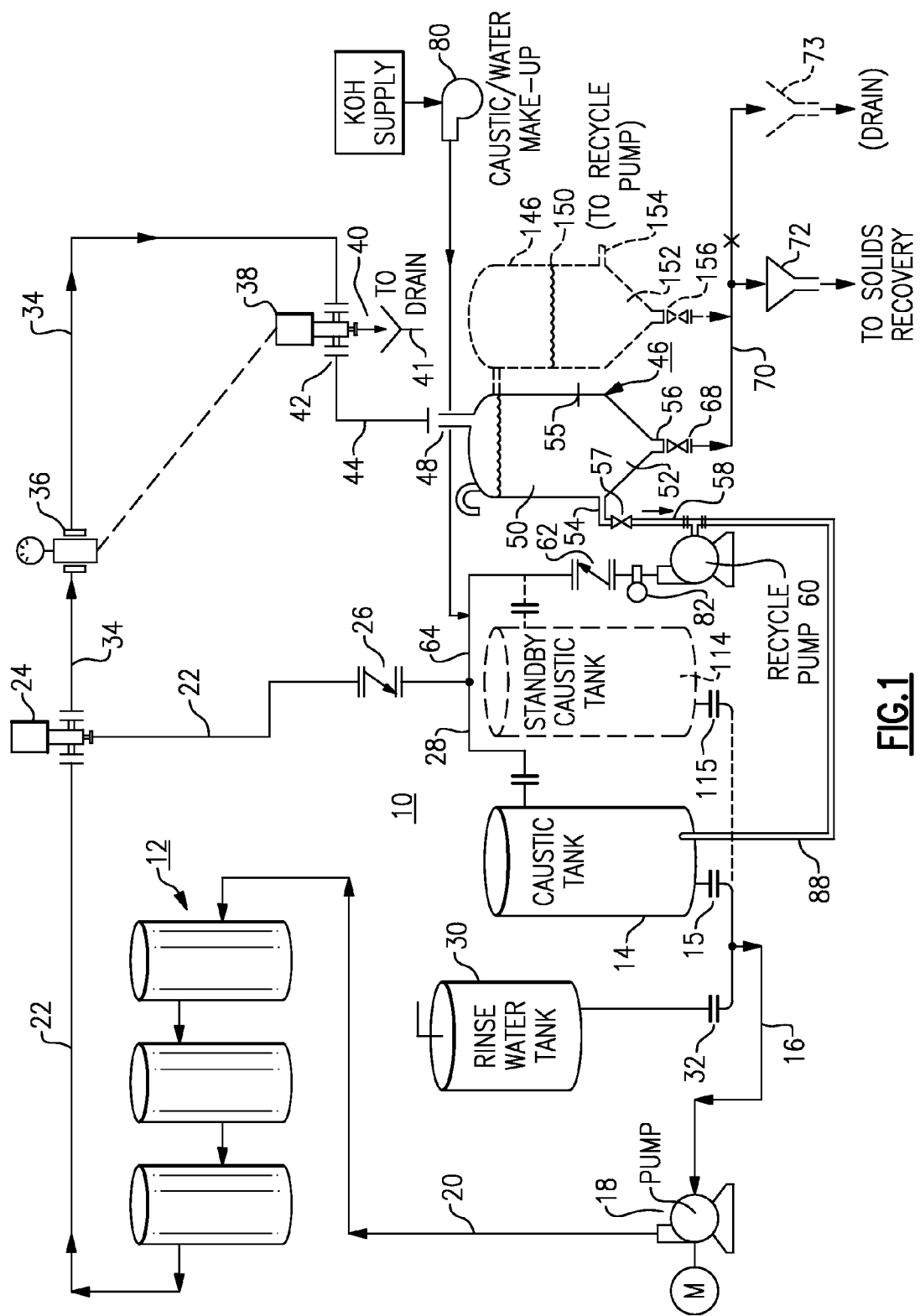
FIG. 1 is a general schematic diagram of a Clean-in-Place system with caustic recovery according to an embodiment of this invention.

As shown schematically in the Drawing figures, and initially with reference to FIG. 1, a clean-in-place cleaning system 10 is shown here in connection with a liquid food processing system 12, which may be of the type for processing milk, ice cream mix, citrus, soups, sauces, or fruit juices, for example. The food processing system is typically designed for continuous process, with sanitary pipes and tubes, evaporators, heat exchangers, pasteurizers, pumps, filters, and the like. The system 12 is represented here as a series of tanks, for the sake of simplicity, but would be understood to include much more equipment in addition. The processing of the product can operate for a period of time, e.g., eight hours or twelve hours. A cleaning cycle is conducted a at a frequency of once, twice, or three times each day, i.e., once each eight hours to twenty-four hours, as well as any time where the product being treated is to be changed. The cleaning cycle is a clean-in-place or C.I.P. cleaning process, in which the cleaning solution is flowed through the food processing system 12 to clean any deposited food solids from the interior walls of the equipment. The cleaning solution is typically a caustic aqueous solution, such as KOH or NaOH dissolved in water. The caustic solution is cycled through the system until the deposited solids have been removed from the interior of the equipment, and then this is followed by a water rinse, and finally the equipment can be sterilized using hot water or steam.

According to the conventional procedures, after the caustic has been cycled through the system, the caustic aqueous solution and the solids that are entrained in it are discharged into a drain as waste, and sent to a municipal sewer or otherwise into the environment. By contrast, in the procedure of this invention, the caustic aqueous solution can be recovered for reuse in a subsequent C.I.P. cleaning cycle, and the solids can also be separated out for a utilitarian purpose.

In the embodiment shown here, the C.I.P. cleaning system has a caustic supply tank 14 which stores a sufficient amount of the caustic solution for the cleaning process. This may be a stainless tank with a capacity of 3,000 gallons for the typical sanitary food processing equipment employed in converting raw citrus juice into concentrate. The tank 14 has an outlet connected through a valve 15 and conduit 16 to a main C.I.P. pump 18. The outlet of the pump 18 supplies the solution under suitable pressure, through a network of tube 20 (only one of which is shown here) into the food processing system 10. A return conduit 22 collects the caustic solution and returns it from an outlet of the system 10 back to the caustic supply tank 14. A diverter valve 24 in the return conduit is normally set to send the returned solution thought a one-way check valve 26 to an intake conduit 28 that leads to the inlet of the caustic supply tank 14.

Also shown here is a rinse water tank 30 holding a supply of clear water, and which has an outlet conduit connected, through a valve 32, to the inlet side of the pump 18.

As shown in broken line in FIG. 1, an optional stand-by caustic tank 114 can be included, holding an additional supply of the caustic aqueous solution, and with valving 115, etc., and conduits similar to that associated with the first-mentioned caustic supply tank 14.

The diverter valve 24 has a second outlet that leads to a branch conduit 34. In this branch conduit is a conductivity sensor, used to gauge the quality of the fluid passing through the branch conduit 34, and this is followed by a second diverter valve 38. The diverter valve 38 has a first outlet 40 that leads to a drain or waste receptacle 41 (e.g., a sewer), and a second outlet 42, that connects to a conduit 44 that leads to the inlet of a caustic recovery tank 46.

The caustic recovery tank 46 is a vertical tank, formed of stainless steel, and having a nominal capacity of 3,000 gallons, which is sufficient to capture the quantity of the caustic solution that is employed in the C.I.P. process, plus the entrained solids. The tank 46 has an inlet pipe 48 on top, receiving the conduit 44. The tank is constructed with a main cylindrical barrel portion 50 and a generally conic portion 52 beneath the barrel portion 50, and with its pointed end or vertex at the base. The caustic recovery tank 46 is shown in more detail in FIG. 3. The conic base portion 52 has an interior cone angle of ninety degrees (i.e., forty-five degrees on either side of the vertical axis). As shown in broken line in FIG. 1, the system may include a second caustic recovery tank 146. The second tank may be configured as an overflow tank receiving excess solution from the first tank 46, or the second tank 146 may be connected in a parallel fashion, so that the tanks 46 and 146 may be filled and emptied alternately, for example, if the cleaning cycles are more frequent, so that there will be an adequate residence time in each tank to allow the solids to settle out. Here, the second tank 146 has a caustic recovery outlet 154 that supplies clear caustic solution to the recovery pump 60, and a solids outlet 156 at the bottom of the conic portion of the tank 146 and leading to the solids discharge line (to be discussed below).

A liquid caustic port 54 is situated near the bottom end of the cylindrical or barrel portion 50 just above the top of the conic portion 52 of the tank 46. A sample valve 55 can be located at the same level on another part of the tank. Also, there is a solids drain port 56 at the bottom of the conic portion 52. A caustic recovery conduit 58 leads from the liquid caustic port 54 to a caustic recovery pump 60 that pumps the recovered caustic solution through a check valve 62 and a return line 64 to the intake conduit 28 (that leads back to the caustic supply tank 14). A valve 57 at the port 54 controls the flow of the recovered caustic solution. As shown in FIG. 1, a branch of the caustic recovery return line 54 can supply the recovered caustic solution to the second or back-up caustic supply tank 114.

A valve 68 at the solids discharge port 56 opens to allow the contents of the conic portion 52 to drain into a solids discharge line 70 that leads to a solids recovery receptacle 72. The receptacle holds the solid food particles, which can be later washed, rinsed, dried, and treated for further use, e.g., as an animal feeds component. The line 70 is provided with suitable valving to divert the flow to a drain 73 when the contents are dilute and contain mostly liquid and little useful solids.

Figure 2:
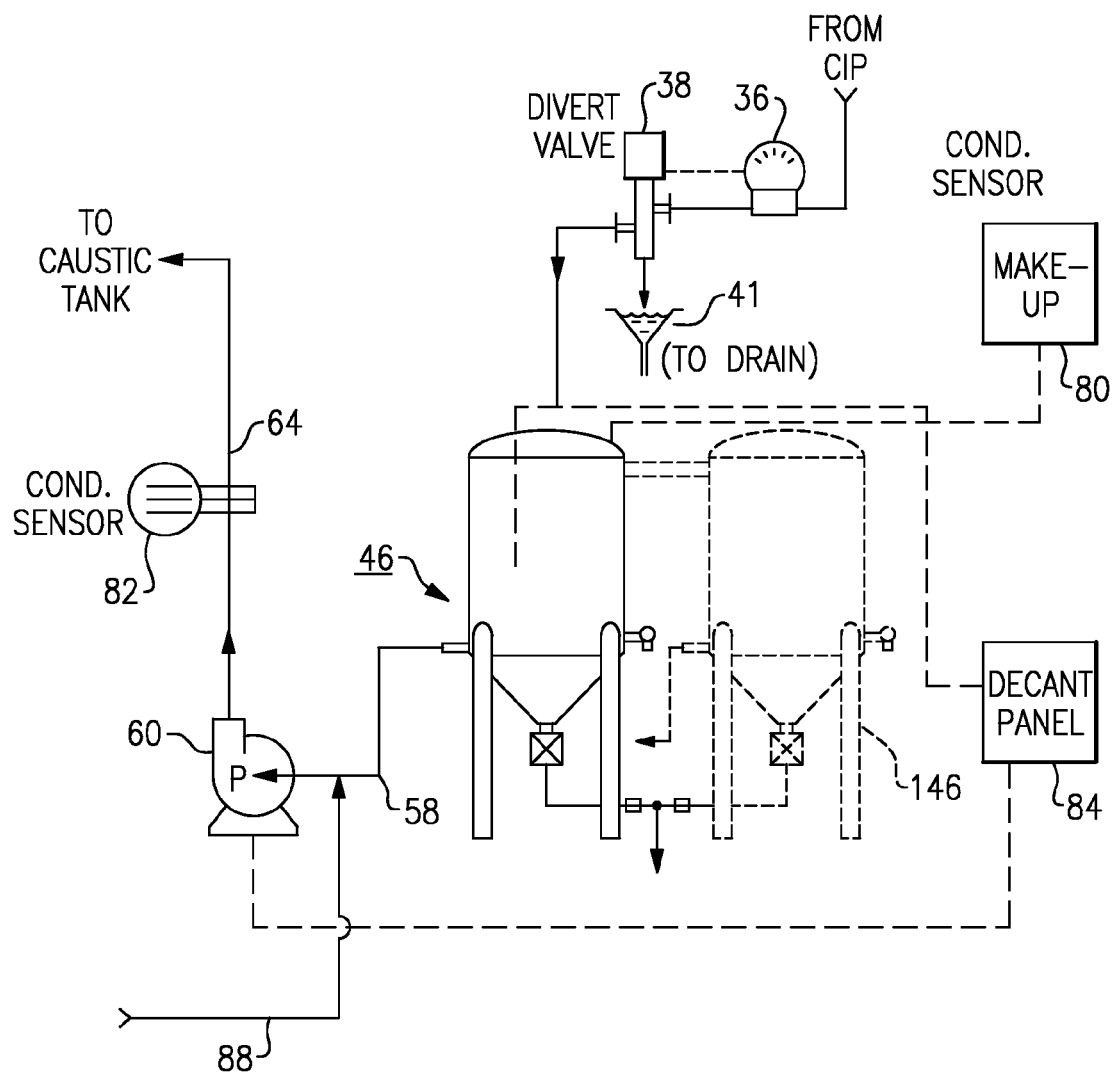
FIG. 2 is a schematic view of a portion of this embodiment.

As shown in FIG. 2, a caustic/water make up supply arrangement 80 is configured to supply additional caustic and/or additional water to the contents of the tank 14 to bring the caustic solution to the required concentration and pH. This can include a pump and a small tank or reservoir of KOH, preferably in a 50% aqueous solution. A conductivity sensor 82 has a probe in the recirculating pipeline 88 to the tank 14, and controls the make up arrangement 80 depending upon the conductivity sensed by the sensor probe. A control panel 84 includes control circuitry to controlling the various pumps and valves to operate the caustic recovery system to bring the caustic solution to the tank 46, and after a suitable settling time to send the solution back to the caustic supply tank 14 and send the solids to the solids recovery receptacle 72. A level control sensor in the tank 46 is connected to the circuitry in the control panel 84.

The diverter valve 38, which is operated by the conductivity sensor 36, sends the recovered caustic solution to the tank 46 so long as the sensed conductivity is high enough to indicate a suitable concentration of caustic. If the sensed conductivity is below a predetermined threshold, which indicates the caustic solution is too dilute to be re-used, then the diverter valve switches the flow to a drain 41.

Figure 3:
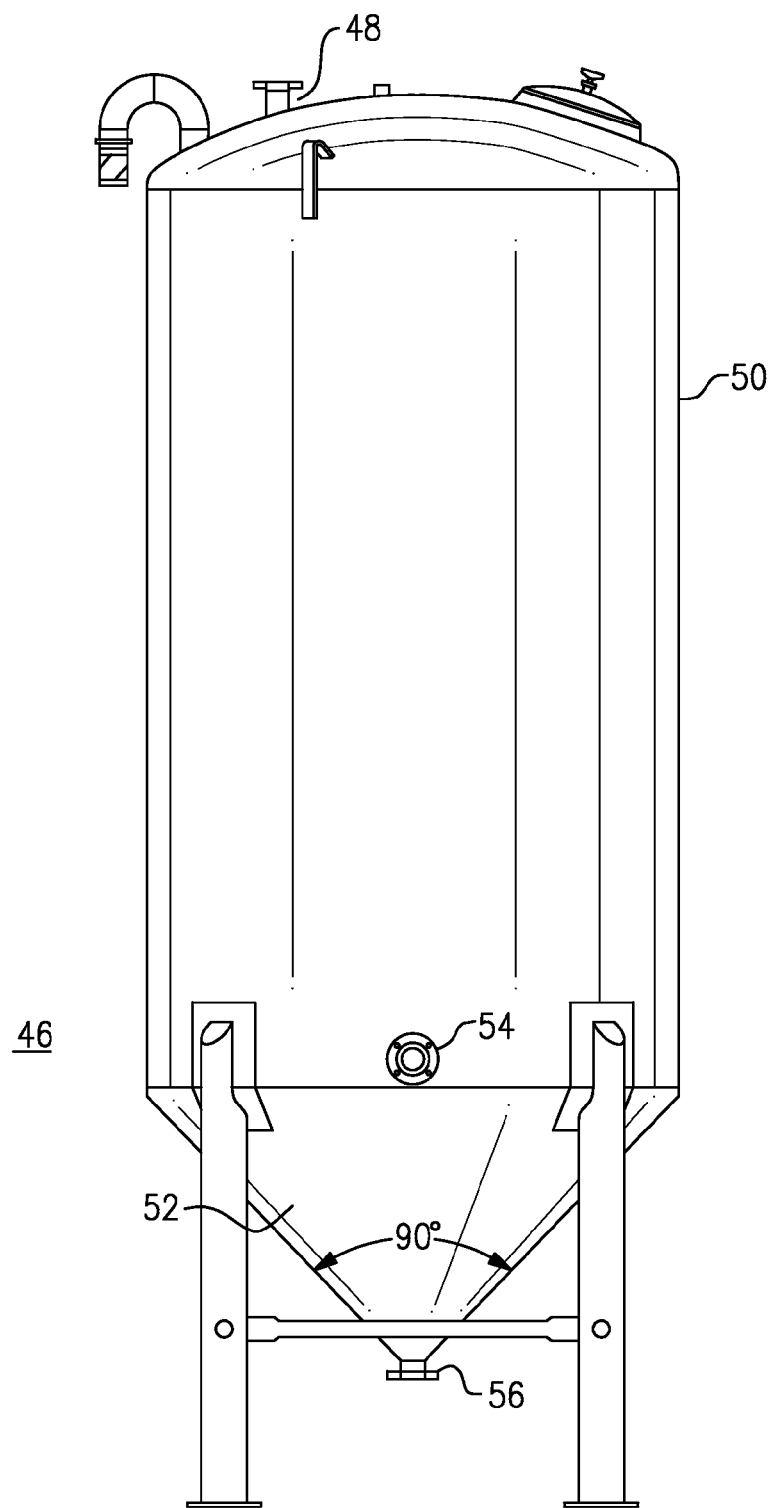
FIG. 3 is an elevation of a caustic recovery tank employed in this embodiment.

The tank 46 (and/or 146) of a preferred embodiment is shown in FIG. 3. The tank is vertical, with the barrel portion 50 being about six-and-one-half feet in diameter, and about ten-feet eight inches vertically, giving it a nominal volume of 3,000 gallons. The conic bottom section has a diameter of six-and-one-half feet, and angles down to a bottom vertex, i.e., solids port 56. The tank is provided with supporting legs 86, that hold the vertex of the cone, i.e., the port 56, about one-and-one-half feet off the floor. At the top end, is a dome, with the inlet 48, as well as vents and other openings, as illustrated. In this embodiment, the tank 46 has an overall height of about seventeen feet. The tank is favorably formed of a food-grade stainless steel.

The clean-in-place process is carried out after a food processing cycle. At the end of that cycle, the conduits and piping are switched over to supply the KOH (or other suitable caustic) in aqueous solution through the food processing equipment 12. The caustic solution is cycled through the path from the caustic supply tank 14, the food process equipment 12, the diverter valve 24 and then back to the tank 14. At the end of the caustic cleaning cycle, the diverter valve 24 switches over to the branch conduit 34, and the caustic solution plus entrained solids, is flowed past the conductivity sensor 36 and diverter valve 38 into the caustic recovery tank. When the diverted flow becomes too dilute, the valve 40 switches over to divert the flow to the drain 41.

The flow of caustic is followed by a water rinse, and then by a heat sterilization, e.g., hot water, steam, or chemical sanitizer. The caustic solution and the solids remain resident in the tank 46 for a time sufficient for the solids to settle down into the conic portion 52 of the tank, and for the liquid in the barrel portion 50 to become clear. For dairy equipment and citrus equipment applications, the settle time can be approximately eight hours. The separation of the solids is effected gravitationally, so the solution in the tank 46 is kept still and is not agitated during that period. After that time, the clear caustic is returned to the caustic supply tank 14. This is effected by the control panel 84 opening the valve 57 to allow the recovered caustic solution to flow from the barrel portion of the tank 46 via the caustic recovery conduit 58, pump 60 and return line 64 back to an inlet of the tank 14 (or of the corresponding tank 114). After this, the valve 68 is opened and the solids are allowed to drain out the solids drain port 56 and solids discharge line 70 into the solids recovery receptacle. At that point, the solids can be subjected to further processing.

Once the tank 46 is emptied, it can be washed and rinsed using internal sprayers (not shown). The rinse water is allowed to drain out the port 56 and drain line 70 to the drain 73.

Thereafter, the tank 46 is ready for a subsequent recovery cycle following the next C.I.P. cleaning operation.

In this embodiment, the tank 46 is formed of a food grade stainless steel, but it is possible to use other modern metals or other materials. It is envisioned that in the future a caustic recovery tank could be formed of a modern durable industrial food-grade plastic resin material.

The caustic recovery system may be retrofitted onto an existing C.I.P. system, e.g., employing the tank 46, pump 60 and other elements shown, e.g., in the right-hand side of FIG. 1 or as shown in FIG. 2. Alternatively, the caustic recovery system may be incorporated as an integral part of a new C.I.P. installation or sanitary food processing installation.

While the invention has been described with reference to a few selected embodiments, it should be recognized that the invention is not limited to those precise embodiments. Rather, many modifications and variations will be apparent to persons skilled in the art without departing from the scope and spirit of this invention, as defined in the appended claims.

We claim:

1. A C.I.P. cleaning system for flowing a caustic aqueous solution through a liquid food processing system, comprising:
    a caustic supply tank holding a quantity of said caustic aqueous solution;
    a rinse water tank holding a supply of rinse water;
    a pump connected at an inlet side thereof to inlet conduits leading from said caustic supply tank and said rinse water tank to said pump inlet side, and connected at an outlet side thereof to a conduit that leads from said pump outlet side to said food processing system;
    controlled valving means for connecting the caustic supply tank and said rinse water tank respectively to said pump;
    a return conduit connected to an outlet of said food processing equipment for receiving therefrom said caustic aqueous solution and entrained food solids cleaned from said food processing system;
    a conductivity sensor detecting electrical conductivity of the solution in the return conduit;
    a diverter valve in line in said return conduit after said conductivity sensor, having a first outlet and a second outlet, the diverter valve being electrically controlled by the conductivity sensor and operative to switch to the first outlet when the sensed conductivity is greater than a predetermined threshold, and to switch to the second outlet when the sensed conductivity is below said predetermined threshold;
    a caustic recovery settling tank of sufficient capacity to hold said quantity of said caustic aqueous solution that had been held in said caustic supply tank, and having a barrel portion and a conic portion below the barrel portion;
    a caustic recovery conduit leading from the first outlet of said diverter valve to an inlet of said caustic recovery tank;
    a solution drain conduit leading from a solution drain port at lower end of said barrel portion above the conic portion of said caustic recovery tank, the solution drain port being at a position such that solids entrained in the caustic solution settle to a level below the solution drain port;
    a solids drain conduit leading from an outlet at the bottom end of the conic portion of the caustic recovery tank;
    a caustic recovery pump in line in said caustic recovery conduit;
    valving situated in said caustic recovery conduit and in said solids drain conduit;
    a portion of said caustic recovery conduit leading from a discharge of the caustic recovery pump to an inlet of said caustic supply tank and adapted for supplying the caustic aqueous solution from the solution drain port of said caustic recovery tank; and
    control means connected with said valving and with said caustic recovery pump, and configured to open said caustic recovery conduit to empty the solution from the barrel portion of the caustic recovery tank and transfer said solution to the caustic supply tank after the solution and entrained solids have remained for a predetermined settle time sufficient for solid particles to settle into the conic portion of the caustic recovery tank, and to operate said caustic recovery pump to pump the solution into said caustic supply tank; and, after the caustic solution has been emptied from the barrel portion of the caustic recovery tank, to open the solids drain conduit to drain the solids residue out of the conic portion and through said solids drain conduit.

2. The C.I.P. cleaning system of claim 1 wherein said caustic recovery tank has a nominal capacity of about 3,000 gallons.

3. The C.I.P. cleaning system of claim 1 wherein said conic portion of said caustic recovery tank has an apex at the bottom thereof, and defines an included angle of substantially ninety degrees.

4. The C.I.P. cleaning system of claim 1 comprising a second caustic recovery tank having a barrel portion and a conic portion below said barrel portion, an inlet, a solution drain outlet at a lower end of said barrel portion and above the conic portion of the second caustic recovery tank; a solids drain outlet at the bottom end of the conic portion of the second caustic recovery tank, and means to divert flow of the caustic solution and entrained solids from the caustic recovery conduit to said second caustic recovery tank.

5. The C.I.P. cleaning system of claim 1 comprising a second caustic supply tank having a capacity for holding said quantity of caustic solution, a caustic supply conduit connecting the second caustic supply tank to said pump; an inlet, a second caustic recovery conduit leading from a discharge port of said caustic recovery pump to the inlet of said second caustic supply tank.

6. The C.I.P. cleaning system of claim 1 comprising a conductivity sensor having a probe immersed in a recirculating pipe for said caustic supply tank and measuring conductivity thereof, a caustic make-up source supplying additional caustic reagent into said caustic supply tank, and control means for actuating said caustic make up source in response to the measured conductivity of the contents of said caustic supply tank.

7. The C.I.P. cleaning system of claim 1 comprising a solids recovery receptacle, wherein said solids drain conduit leads from the lower end of the conic portion of said caustic recovery tank to said solids recovery receptacle, wherein said solids are retained for further processing into a product.

8. The C.I.P. cleaning system of claim 1 comprising a main diverter valve having an inlet and a first outlet connected in line in said return conduit ahead of said conductivity sensor, and having a second outlet, and a conduit leading from said second outlet thereof to an inlet of said caustic supply tank.

9. The C.I.P. cleaning system of claim 1 further comprising a recirculating pipe leading from the caustic supply tank to an inlet of said caustic recovery pump.

10. The C.I. P. cleaning system of claim 1 wherein said predetermined settle time is substantially eight hours.

* * * * *